No. 12,736. REISSUED DEC. 31, 1907.
T. DANQUARD.
PNEUMATIC MOTOR AND SPEED GOVERNOR.
APPLICATION FILED JULY 11, 1907. 2 SHEETS—SHEET 1.
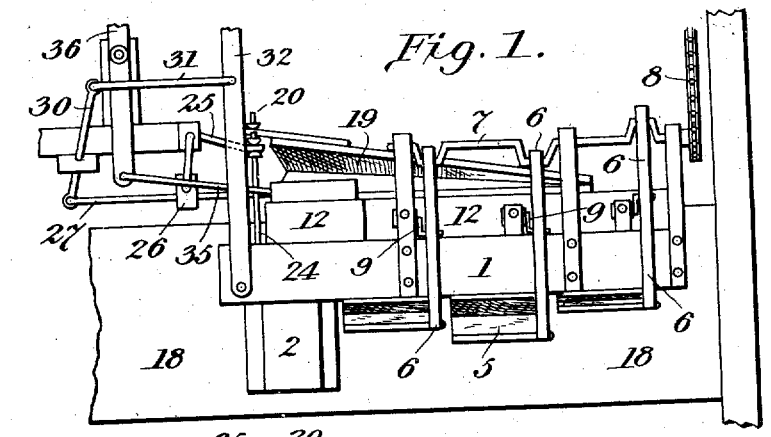
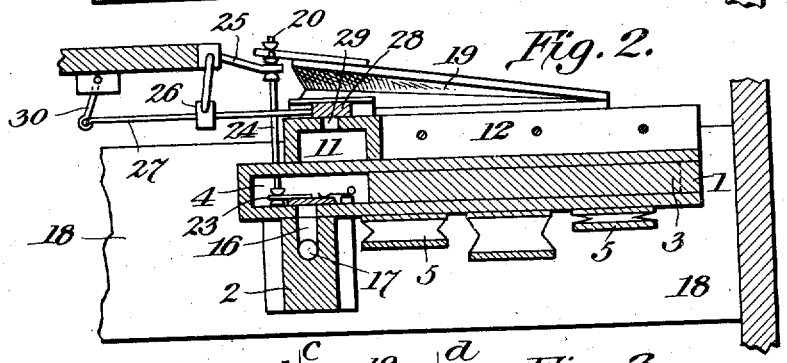
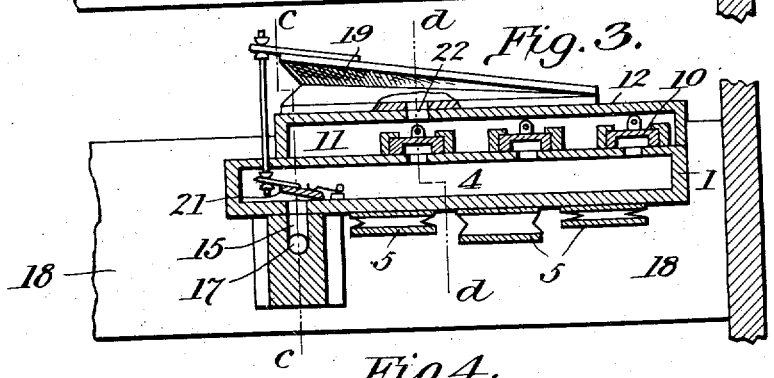
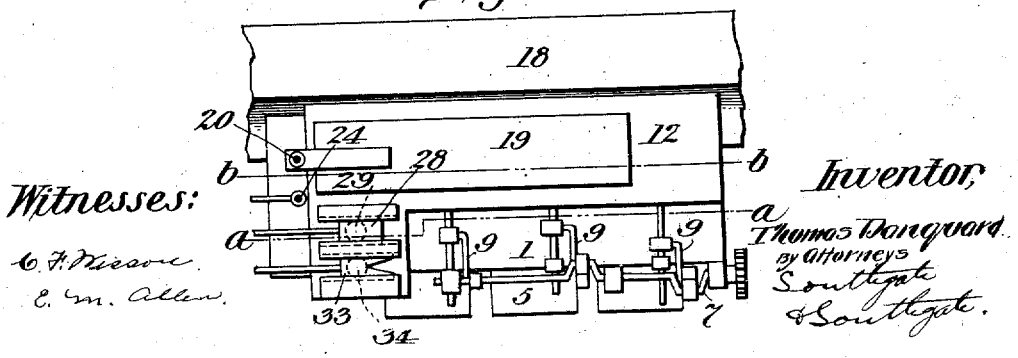
Witnesses:
C. F. Wesson
E. M. Allen.
Inventor,
Thomas Danquard
By Attorneys
Southgate & Southgate.
THE NORRIS PETERS CO., WASHINGTON, D. C.

No. 12,736. REISSUED DEC. 31, 1907.

T. DANQUARD.

PNEUMATIC MOTOR AND SPEED GOVERNOR.

APPLICATION FILED JULY 11, 1907. 2 SHEETS—SHEET 2.

Witnesses:

C. F. Wesson

E. M. Allen

Inventor,

Thomas Danquard by Attorneys

Southgate & Southgate

THE NORRIS PETERS CO., WASHINGTON, D. C.

UNITED STATES PATENT OFFICE.

THOMAS DANQUARD, OF NEW YORK, N. Y., ASSIGNOR TO THE AUTOPIANO COMPANY, OF NEW YORK, N. Y., A CORPORATION OF NEW YORK.

PNEUMATIC MOTOR AND SPEED-GOVERNOR.

No. 12,736. Specification of Reissued Letters Patent. Reissued Dec. 31, 1907.

Original application filed October 8, 1904, Serial No. 227,625. Divided and this application filed February 8, 1905. Serial No. 244,819. Original No. 797,181, dated August 15, 1905. Application for reissue filed July 11, 1907. Serial No. 383,350.

*To all whom it may concern:*

Be it known that I, THOMAS DANQUARD, a citizen of the United States, residing at New York, in the county of New York and State of New York, have invented a new and useful Improvement in Pneumatic Motors and Speed-Governors, of which the following is a specification.

This application is a division of my pending application to patent "Mechanical musical instruments" filed October 8, 1904, and having Serial No. 227,625.

The herein-described invention relates to a motor of that general pneumatic class used to propel the music-sheet in an automatic piano-player or self-playing piano or like mechanical musical instrument; and the invention has for its object to provide simple, efficient, and durable devices whereby the speed of the motor and music-sheet may be governed or regulated at the will of the performer to assure any desired "tempo" of the music.

The invention will first be described and then will be particularly defined in claims hereinafter set forth.

Reference is made to the accompanying drawings, forming part of this specification, and in which—

Figure 5:
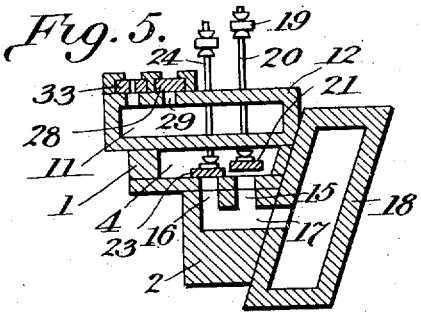
Figure 6:
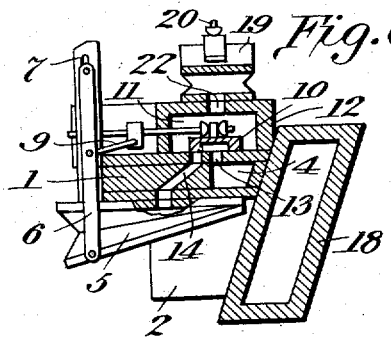
Figure 7:
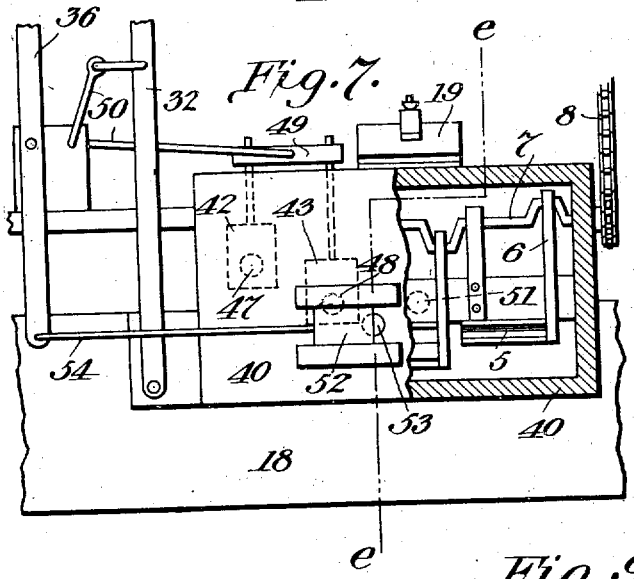
Figure 8:
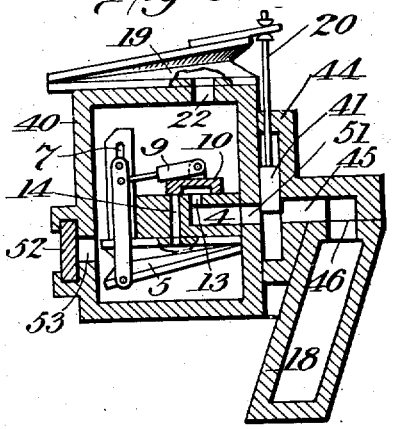
Figure 9:
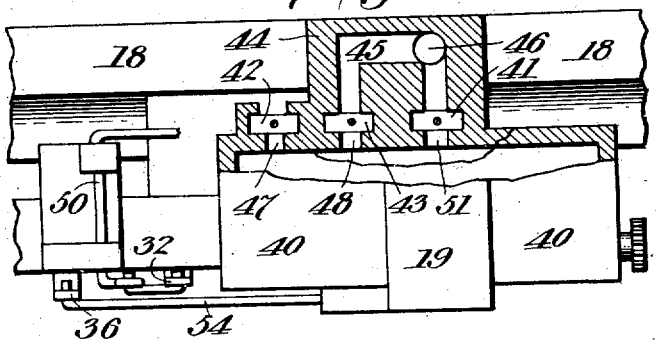

Figure 1 is a front view of the improved pneumatic motor and speed-governor and adjacent portions of a pneumatic-action wind-chest and the motor-valve-operating mechanism. Fig. 2 is a longitudinal vertical sectional view of the motor and governor and adjacent parts, taken on the line *a—a* in Fig. 4. Fig. 3 is a vertical section taken on the line *b—b* in Fig. 4. Fig. 4 is a plan view of the motor. Fig. 5 is a vertical cross-section taken on the line *c—c* in Fig. 3. Fig. 6 is a vertical cross-section taken on the line *b—b* in Fig. 3. Fig. 7 is a partly-broken-out sectional front view showing a modified motor and speed-governor. Fig. 8 is a vertical transverse section thereof, taken on the line *e—e* in Fig. 7; and Fig. 9 is a plan view of this modification, partly in horizontal section.

In one prior governor intended for regulating the speed of a music-sheet motor to assure required tempo of the music a governor-valve located between the motor and the main wind-inducing bellows has been automatically operated by a governor-pneumatic having direct connection with the bellows. In another prior construction and for like purpose a valved governor-pneumatic has been interposed in the windway between the motor and the bellows.

Both of the improved motors and speed-governors herein shown and described have one common or generic novel feature in that the valves which directly control the motor-shaft-turning pneumatics are inclosed within a casing having communication with a governor-pneumatic which is not directly connected with the main bellows and is not located between the motor and said bellows. This governor-pneumatic nevertheless controls a means or valve which automatically regulates the flow of air through the motor to assure its uniform rotation at any desired speed.

In the construction shown in Figs. 1 to 6 of the drawings the numeral 1 indicates the motor wind-chest, which at one end may have a forward extension 2, accommodating special passages and valves hereinafter described. A portion of the chest 1 is shown partly filled by a block 3, or the chest may be partitioned to form an interior chamber 4, which is shown extending the full length of the chest and broadening at its end extension 2. To the chest 1 are secured a number of bellows-pneumatics 5, which connect by pitmen 6 with cranks of the motor-driving shaft 7, from which a chain belt 8 may run to the music-sheet rolls, which need no illustration. Links 9 connect the pitmen 6 with the stems of a series of valves 10, which are preferably slide-valves arranged one for each pneumatic 5. The motor-valves 10 are all inclosed within the chamber 11 of a casing 12, preferably fixed to the motor wind-chest 1. Series of ports 13, 14 respectively connect said chamber 11 with the motor-pneumatics 5 and the wind-chest chamber 4, and said chamber 4 in a preferred construction opens by either of two ports 15, 16 into a common outlet-passage 17, which communicates with the action wind-chest 18, through which air is moved by the main bellows (not shown) of the piano-player or other mechanical musical instrument. Preferably on the casing 12 is arranged a governor-pneumatic 19, the movable wall of which connects by a stem 20 with a valve 21, herein shown as a flap-valve located in the motor wind-chest chamber 4 and controlling its air-outlet port 15. The governor-pneumatic 19 communicates directly by a port 22 with the chamber 11 of the motor-valve casing 12. The port 22, chamber 11, ports 14 and 13, chamber 4, and outlet passage 17 constitute a passage from the governor pneumatic to the action wind-chest, into the ports 14 of which passage opens the motor, between the governor pneumatic and the action wind-chest. Another flap-valve 23 controls the port 16 and is shown coupled by a stem 24 to one end of a crank-arm 25, the other end of which engages a block 26, fixed to the stem 27 of a reroll-valve 28, preferably sliding upon the outside of the valve-casing 12 and controlling a port 29, opening from the atmosphere into this casing. The valve-stem 27 is shown coupled to an armed rocking lever 30, connected by a link 31 with the usual reroll stop-lever 32. A "tempo-valve" 33, which is shown sliding on the motor-valve casing 12 over its port 34, has a stem 35 coupled to the usual "tempo stop-lever" 36 of the instrument.

The operation of the governed music-sheet motor (shown in Figs. 1 to 6 of the drawings) is as follows: When the lever 36 is adjusted to open the tempo-valve 33 sufficiently to assure the desired speed of rotation of the motor-shaft 7 and proper speed of travel of the music-sheet, atmospheric air entering the port 34 is drawn by the main bellows-exhaust through the chamber 11 of the casing 12 and past the motor-valves 10, which will cause inflation and collapse of the pneumatics 5 as the air is drawn through them via the ports 14, 13 and through the chamber 4 and thence past the open governor-valve 21 to the port 15 and passage 17 to the main wind-chest 18. Should the main bellows-operating pedals now be irregularly worked, either accidentally or intentionally, the governor-pneumatic 19, which is under influence of the exhaust through the port 22, opening into the chamber 11 of the valve-casing 12, will be collapsed more or less and will correspondingly operate the governor-valve 21 to more or less choke the air-outlet at the port 15 and passage 17 to the wind-chest 18, and thus will the desired predetermined speed of the motor and music-sheet be regularly maintained irrespective of the manner of working the air-exhaust-producing pedals and bellows of the instrument. Should it be necessary to rewind the music-sheet upon its delivery-roll, the reroll stop-lever 32 is moved to the left hand, and its above-described connections 24 and 31 will simultaneously move both valves 28, 23 and open their respective ports 16, 29, and thus permit free passage of atmospheric air through the port 29, the motor-valve-casing chamber 11, the motor-valves 10, the pneumatics 5, the motor-wind-chest chamber 4, and the ports 15, 17 to the wind-chest 18 and the main wind-inducing devices of the instrument. This allows full volume of air to pass through the motor to assure its maximum speed for quickly rewinding the music-sheet and entirely independent of the tempo-valve 33, which then may be open to any extent or may be entirely closed.

The modified motor and governor shown in Figs. 7, 8, and 9 of the drawings will now be described. In this construction the casing 40, which incloses the motor-pneumatic valves 10, also has a port 22, forming a wind-way connection for the governor-pneumatic 19. This casing 40 also incloses the motor-pneumatics 5 and the connections 6 therefrom to the motor-driving shaft 7 and valve-operating pitmen 9. The port 22 is shown in the top wall of the casing 40, and the governor-pneumatic valve 41 and the two reroll-valves 42, 43 are all of the slide-valve type and are preferably arranged in line in a valve-chest 44 at the back of the casing. Said valve-chest has an air-passage 45 common to the two valves 41, 43 and opening at 46 to the wind-chest 18. The valve 42 controls a port 47, admitting atmospheric air to the casing 40 to find outlet through a port 48 past the open valve 43 during rewinding of the music-sheet. To assure such operation, both valves 42, 43, having stems connected by a cross-head 49, are simultaneously lifted or opened by one arm of an elbow-lever 50, which is coupled to the reroll stop-lever 32. The pneumatic-governor valve 41 controls a port 51, leading from the casing 40 to the valve-chest passage 45 and wind-chest passage 46. The tempo-valve 52 is shown arranged at the front of the casing 40 to control a port 53 in the casing, admitting atmospheric air thereto and to the motor-valves 10. The valve 52 may be coupled by a link 54 with the tempo-controlling stop-lever 36. The operation of this modified motor is substantially similar to that of the valve-incased motor of Figs. 1 to 6 of the drawings. When the tempo-valve 52 is opened more or less by operating the lever 36, atmospheric air entering the casing 40 at the port 53 will pass through the motor-valves 10, which will cause inflation and collapse of the pneumatics 5 to rotate the motor-driving shaft 6 and the air will escape through the port 51 past the governor-valve 41, which is automatically actuated by the pneumatic 19, acting under influence of the air-exhaust to throttle the port 51 more or less to maintain any desired speed of the motor, however the wind-inducing pedals and bellows may be operated. The simultaneous opening of the ports 47, 48 by moving the valves 42, 43 by or from the reroll stop-lever 23 will assure full wind-current to obtain maximum motor speed during rewinding of the music-sheet and independently of the position or adjustment of the tempo-valve 52. This modified motor has a few advantages over the valve-incased motor first described in that the entire motor is protected by its casing 40 from dust and dirt, and the ease and steadiness of working of the motor are facilitated by the collapse and inflation of the pneumatics 5 within a partial vacuum induced by exhausting air from the casing 40.

It is obvious that the second reroll-valve 28 or 42 of the above-described motors may be dispensed with if it is desired to fully open the tempo-valve, when the music-sheet is to be rewound; but the use of the two reroll-valves for either motor is preferred in practice, as it assures maximum motor speed by operating only the reroll-lever, thus obviating the necessity of operating the tempo-lever to assure quick rewinding of the music-sheet.

Various modifications of this invention may be made by the skilled mechanic within the scope of the appended claims—as, for instance, the motor may have any style of pneumatic devices operating its driving-shaft, with valves or other means for controlling said devices—and any type of valve or other device may be used to admit air to the motor-valve casing or to the casing inclosing the entire motor, and the governor-pneumatic communicating with said casing may be variously formed or applied, and any suitable means or valve controlled by the governor-pneumatic may be used to automatically regulate the air-current to maintain desired speed of the motor.

While I have illustrated and described particular forms of the invention, I am aware that modifications may be made therein by any person skilled in the art without departing from the scope of the invention as expressed in the claims. Therefore, I do not wish to be limited to the particular form shown, but What I do claim is:—

1. A pneumatic motor and speed-governor, comprising a motor including a driving shaft with pneumatic devices actuating said shaft and means directly controlling operation of said pneumatic devices, a casing inclosing said means controlling the pneumatic devices, means regulating inlet of air to said casing, a governor pneumatic communicating with the casing, and means in the motor windway controlled by said governor pneumatic and automatically regulating the air current to maintain any desired speed of the motor.

2. A pneumatic motor and speed governor, comprising a motor including a driving shaft with pneumatics actuating said shaft and valves directly controlling operation of said pneumatics, a casing inclosing said pneumatic controlling valves, means regulating inlet of air to said valve inclosing casing, a governor pneumatic communicating with the casing, and a valve in the motor windway controlled by said governor pneumatic and automatically regulating the air current to maintain any desired speed of the motor.

3. A pneumatic motor and speed governor, comprising a motor including a driving shaft with pneumatic devices actuating it and means directly controlling operation of said pneumatic devices, a casing inclosing said motor, means regulating inlet of air to said motor inclosing casing, a governor pneumatic communicating with said casing, and means in the motor windway controlled by said governor pneumatic and automatically regulating the air current to maintain any desired speed of the incased motor.

4. A pneumatic motor and speed governor, comprising a motor including a driving shaft with pneumatics actuating said shaft and valves directly controlling operation of said pneumatics, a casing inclosing said motor, means regulating inlet of air to said motor inclosing casing, a governor pneumatic communicating with said casing, and a valve in the motor windway controlled by said governor pneumatic and automatically regulating the air current to maintain any desired speed of the incased motor.

5. A pneumatic motor comprising a driving shaft, pneumatics and connections therefrom to said shaft for rotating it, valves controlling the motor shaft driving pneumatics, and a casing inclosing said valves, combined with a governor comprising a pneumatic opening to said casing and a valve in the motor windway automatically controlled by the governor pneumatic, and a tempo-valve controlling admission of air to the valve inclosing casing.

6. A pneumatic motor comprising a driving shaft, pneumatics and connections therefrom to said shaft for rotating it, valves controlling the motor shaft driving pneumatics, and a casing inclosing said valves, combined with a governor comprising a pneumatic opening to said casing and a valve in the motor windway automatically controlled by the governor pneumatic, a tempo-valve controlling admission of air to the valve inclosing casing, and a reroll valve operating in the windway between the motor valves and the wind inducing devices.

7. A pneumatic motor comprising a driving shaft, pneumatics and connections therefrom to said shaft for rotating it, valves controlling the motor shaft driving pneumatics, and a casing inclosing said valves, combined with a governor comprising a pneumatic opening to said casing, a valve in the motor windway automatically controlled by the governor pneumatic, a tempo-valve controlling admission of air to the valve casing;

and two simultaneously actuated reroll valves, one operating in the windway between the motor valves and the wind inducing devices and the other operating at an opening admitting air to the motor valve at an opening admitting air to the motor valve inclosing casing.

8. A pneumatic motor comprising a driving shaft, pneumatics and connections therefrom to said shaft for rotating it, valves controlling motor shaft driving pneumatics, and a casing inclosing said valves and the motor pneumatics and the connections therefrom to the motor driving shaft, combined with a governor comprising a pneumatic opening to said casing and a valve in the motor windway automatically controlled by the governor pneumatic, and a tempo-valve controlling admission of air to the motor inclosing casing.

9. A pneumatic motor comprising a driving shaft, pneumatics and connections therefrom to said shaft for rotating it, valves controlling the motor shaft driving pneumatics, and a casing inclosing said valves and the motor pneumatics and the connections therefrom to the motor driving shaft, combined with a governor comprising a pneumatic opening to said casing and a valve in the motor windway automatically controlled by the governor pneumatic, a tempo-valve controlling admission of air to the motor inclosing casing; and a reroll valve operating in the windway between the motor valves and the wind inducing devices.

10. A pneumatic motor comprising a driving shaft, pneumatics and connections therefrom to said shaft for rotating it, valves controlling the motor shaft driving pneumatics, and a casing inclosing said valves and the motor pneumatics and the connections therefrom to the motor driving shaft, combined with a governor comprising a pneumatic opening to said casing and a valve in the motor windway automatically controlled by the governor pneumatic, a tempo-valve controlling admission of air to the motor inclosing casing; and two simultaneously actuated reroll valves, one operating in the windway between the motor valves and the wind inducing devices and the other operating at an opening admitting air to the motor inclosing casing.

11. A governed pneumatic motor, comprising a chamber 4 communicating with wind inducing devices, pneumatics 5 communicating with said chamber, valves 10 controlling the pneumatics 5, means operating the valves 10 and the motor driving shaft from the pneumatics 5, a casing inclosing the valves 10, a governor pneumatic 19 opening to said casing, a valve at the air outlet of said chamber, connections from the pneumatic 19 to said outlet valve, and a valve admitting air to said casing.

12. A governed pneumatic motor comprising a chamber communicating with wind inducing devices, pneumatics 5 communicating with said chamber, valves 10 controlling the pneumatics 5, a casing inclosing the valves 10, the pneumatics 5 and the connections 9, 6, of said pneumatics with the valves 10 and the motor driving shaft; a governor pneumatic 19 opening into the casing, a valve at the air outlet of said chamber, connections from the pneumatic 19 to said outlet valve, and a valve admitting air to the motor inclosing casing.

13. A governed pneumatic motor comprising ports 13, 14, a chamber 4, ports, opening to wind inducing devices, pneumatics 5 connecting with the ports 13, 14, valves 10 controlling the ports 13, 14 and pneumatics 5, and operated by said pneumatics, a casing inclosing the valves 10 and having a tempo valve port, a governor pneumatic 19 connecting by a port 22 with said casing, a valve working at one of said ports opening to the wind inducing devices and operated by the pneumatic 19, a reroll valve operative at the other of said ports, and a tempo-valve operative at the tempo valve port.

14. A governed pneumatic motor comprising a wind-chest having ports 13, 14, a chamber 4, and ports opening to wind inducing devices, pneumatics 5 connecting with the ports 13, 14, valves 10 controlling the ports 13, 14 and pneumatics 5 and operated by said pneumatics, a casing inclosing the valves 10 and having two ports, a governor pneumatic 19 connecting by a port 22 with the casing, a valve 21 working at one of the ports opening to the wind inducing devices and operated by the pneumatic 19; a reroll valve operative at one of said two ports of the casing, a simultaneously working reroll valve operative at the other of the ports opening to the wind inducing devices, and a tempo-valve working at the second of said two ports of the casing 15. A pneumatic motor and speed governor comprising a motor including a driving shaft and having a motor windway, with pneumatic devices actuating said shaft, a governor pneumatic means operated by said pneumatic devices for directly controlling the operation of said pneumatic devices and controlling the connection of the governor pneumatic with the motor windway, and separate means in the motor wind-way controlled by said governor pneumatic for automatically regulating the air current to maintain any desired speed of the motor.

16. A pneumatic motor and speed governor comprising a motor including a driving shaft and having a motor windway with pneumatics actuating said shaft a governor pneumatic and valves between the motor windway and governor pneumatic directly controlling the operation of said pneumatics, and a valve in the motor wind-way controlled by said governor pneumatic and automatically regulating the air current to maintain any desired speed of the motor.

17. A pneumatic motor and speed governor comprising a motor including a driving shaft, pneumatic devices actuating it, means directly controlling the operation of said pneumatic devices, a governor pneumatic, the pneumatic devices being located between the governor pneumatic and the main bellows, and means in the motor wind-way controlled by said governor pneumatic for automatically regulating the air current to maintain any desired speed of the motor.

18. A pneumatic motor and speed governor comprising a motor including a driving shaft with pneumatics actuating said shaft, and valves operated automatically by said pneumatic and directly controlling the operation of said pneumatics, means for regulating the inlet of air to the motor, a governor pneumatic, an action wind-chest, said valves being located between the governor pneumatic and action wind-chest, and a valve in the motor wind-way controlled by said governor pneumatic for automatically regulating the air current to maintain any desired speed of the motor.

19. A pneumatic motor comprising an action wind-chest, a driving shaft, pneumatics, and connections therefrom to said shaft for rotating it, valves for controlling the motor shaft driving pneumatics combined with a governor comprising a pneumatic, and a valve in the motor wind-way automatically controlled by the governor pneumatic, said valves being located between the governor pneumatic and the action wind-chest, and a tempo-valve controlling the admission of air to the governor pneumatic.

20. A pneumatic motor comprising an action wind-chest, a driving shaft, pneumatics, connections from the pneumatics to said shaft for rotating it, ports leading to the motor shaft driving pneumatics valve controlling said ports combined with a governor, said ports being located between the action wind-chest and the governor, said governor comprising a pneumatic, a valve in the motor wind-way controlled by the governor pneumatic, a tempo-valve, and a reroll valve operating in the wind-way between the motor valves and the wind inducing devices.

21. The combination with an action wind-chest, pneumatic motor, and wind-ways connecting them, of a motor governor comprising a valve controlling said wind-ways and a pneumatic located outside said wind-ways and communicating indirectly therewith, the motor pneumatics being connected with the connections from the wind-chest to the governor pneumatic at a point between said wind-chest and governor pneumatic.

22. The combination of an action wind-chest, a pneumatic governor connected therewith, a valve controlling said connection, and a pneumatic motor having passages on one side of the valve connected with said wind-chest, whereby it may be operated therefrom, and passages on the other side of the valve connected with the governor, whereby said motor will be controlled by the governor.

23. The combination of an action wind-chest, a pneumatic governor, a passage connecting them and a pneumatic motor operated from said wind-chest controlled by said governor and connected with said passage at a point between the governor and wind-chest.

24. The combination of a wind-chest, a pneumatic governor indirectly connected with the wind-chest, and a motor controlled by said governor and directly connected with the wind-chest at a point between the governor and wind-chest.

25. The combination of an action wind-chest, a motor windway connected therewith and having a port, a motor, a second port communicating with the motor, a valve adapted to connect said ports whereby the motor is connected with the action wind-chest, and a governor pneumatic having a valve independent of the first named valve for controlling said motor windway, the first named port being located between the governor and action wind-chest.

26. The combination of an action wind-chest, a motor windway connected therewith and having a port, a motor, a second port communicating with the motor, a valve adapted to connect said ports whereby the motor is connected with the action wind-chest, and a governor pneumatic having a valve independent of the first named valve for controlling said motor windway, said governor pneumatic having a port, the communication of which with the motor wind-way is controlled by the first named valve.

In testimony whereof I have hereunto set my hand, in the presence of two subscribing witnesses.

THOMAS DANQUARD.

Witnesses:
J. O. CAMPBELL,
WM. P. COLLINS.